O. K. PORTER.
FRUIT GRADER.
APPLICATION FILED MAR. 16, 1912.
1,043,249.
Patented Nov. 5, 1912.
2 SHEETS—SHEET 1.
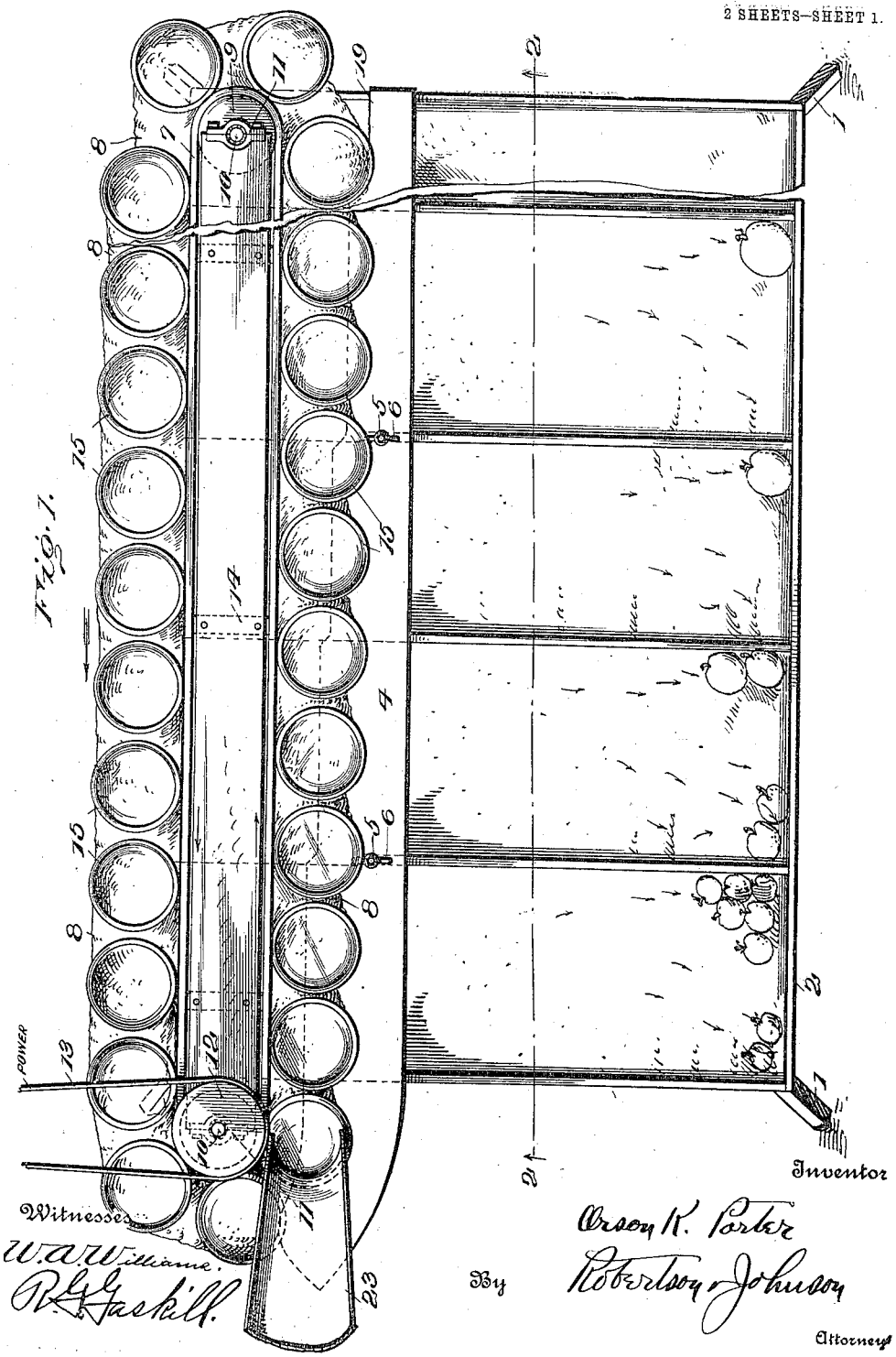
Witnesses
W. A. Williams
R. L. Gaskill
Inventor
Orson K. Porter
By Robertson & Johnson
Attorneys O. K. PORTER.
FRUIT GRADER.
APPLICATION FILED MAR. 16, 1912.
1,043,249.
Patented Nov. 5, 1912.
2 SHEETS—SHEET 2.
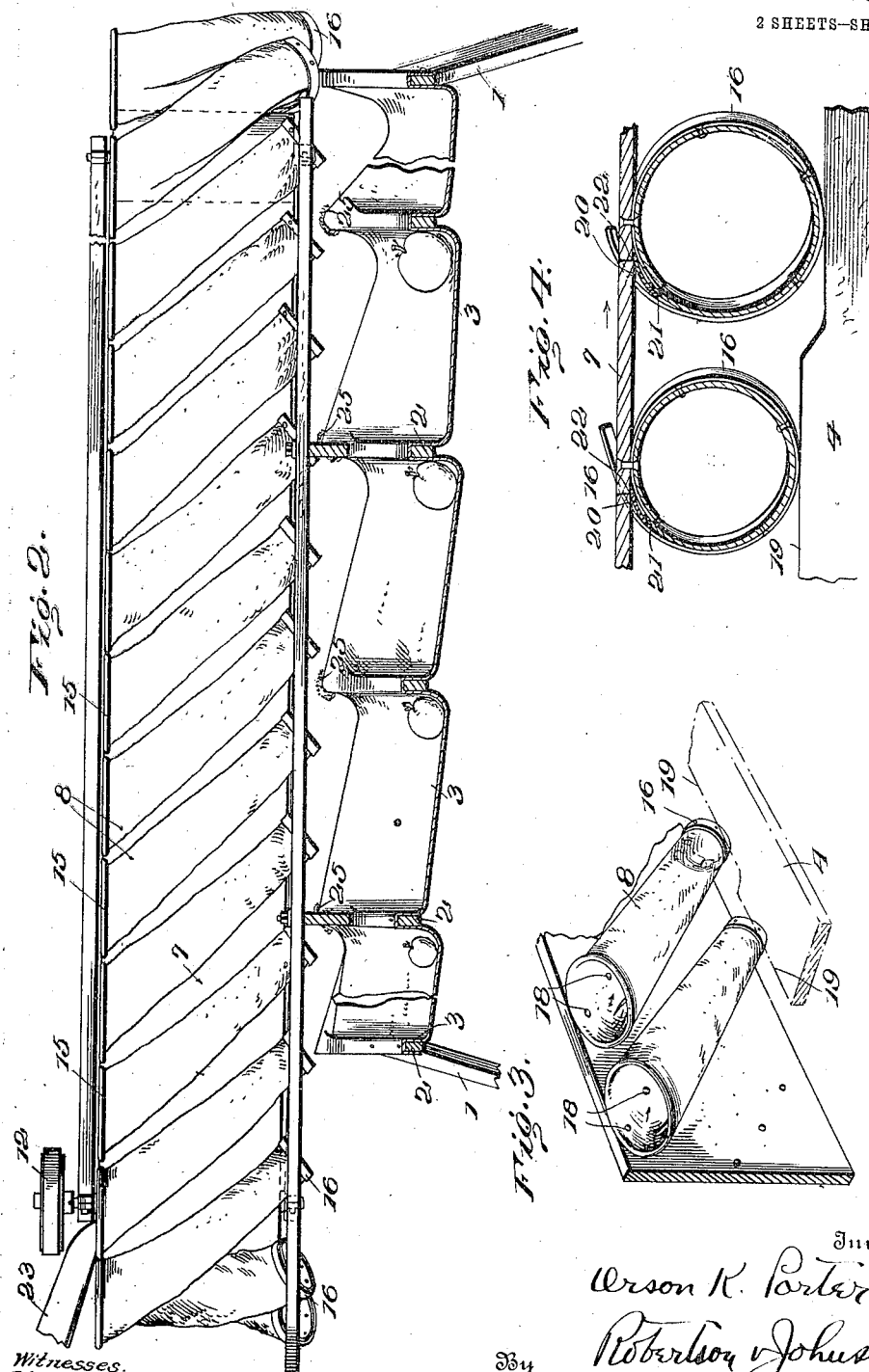

UNITED STATES PATENT OFFICE.

ORSON K. PORTER, OF THE DALLES, OREGON, ASSIGNOR TO OREGON FRUIT CLEANER COMPANY, OF THE DALLES, OREGON, A CORPORATION OF OREGON.

FRUIT-GRADER.

1,043,249.   Specification of Letters Patent.   Patented Nov. 5, 1912.

Application filed March 16, 1912. Serial No. 684,122.

*To all whom it may concern:*

Be it known that I, ORSON K. PORTER, a citizen of the United States of America, and a resident of The Dalles, in the county of Wasco and State of Oregon, have invented certain new and useful Improvements in Fruit-Graders, of which the following is a specification.

My invention relates to fruit graders and while it is adapted for use with many kinds of fruits, it is more particularly designed for handling fruits such as apples and especially peaches which are readily bruised, its purpose being to produce an efficient grader which cannot injure the most delicate fruit. To this end I have provided improved feeding means and improved receiving devices, both being of such a nature as to preserve the fruit from injury and permit it to roll through the machine without dropping any substantial distance.

Various features of novelty are embodied in my grader, among them the provision of individual inclined fruit holding bags of flexible material which are carried successively over the inlet openings of a series of bins and are provided at their bottoms with spring outlets, the extent of the opening of which is determined by cams corresponding to the various bins. The receiving means is also novel in providing inclines receiving the fruit as it passes from a holder and along which it rolls to a position of rest or until it is removed by a packer. The simplest construction is that illustrated in which the bottom of each bin is slanted forward and outward as well as downward from substantially the plane in which the fruit is fed and from the head end of the inlet of that bin.

Referring to the drawings: Figure 1 is a plan view of the grader. Fig. 2 is a longitudinal section on the line 2—2, Fig. 1, looking in the direction of the arrows. Fig. 3 is a detail perspective view showing a part of the support, individual fruit holding bags thereon and a part of the gage rail. Fig. 4 is a detail section through two successive bags and the support showing the action of the gage rail and of the spring outlets.

As is usual in machines of this character I provide a series of bins having alined inlet openings increasing successively in size from the head to the foot of the grader. The bottoms of these bins are constructed in a manner hereinafter to be described. They are supported by legs 1 or other suitable means and are constructed of the usual framing 2 to which are secured the bottoms 3 which are suitably of canvas or other soft material which cannot injure the fruit. Upon the framing 2 is mounted the gage rail 4 which is rendered adjustable by bolts 5 and slots 6. This gage rail is made up of a series of sections corresponding with the respective bins and leaving openings increasing successively in width from the head toward the foot of the grader over the said bins. In order to protect the fruit from injury I employ a series of individual fruit holders mounted on a movable support. In the embodiment of my invention illustrated herein this support takes the form of an endless belt 7 arranged in a vertical plane and carrying a series of bags 8 of flexible material as canvas. These bags are located side by side and extend downward from the upper part to the lower part of the belt and are inclined forward, i. e., in the direction in which the active flight of the belt moves which is from the head to the foot of the grader, this movement carrying the lower ends of said holders successively over the said inlet openings. The belt 7 is mounted on vertical drums 9 secured to shafts 10 mounted in bearings 11. The shaft 10 at the head end of the grader is provided with a pulley 12 through which the belt 7 is driven by the driving belt 13. A suitable backing frame 14 is provided for maintaining the belt in proper position and preventing it from being forced inward by the cam action to be hereinafter described.

The bags 8 above mentioned are held distended at their tops by metal rings 15 and are provided at their bottoms with band springs 16 secured to the said bottoms and preferably lying in planes oblique to the horizontal. The bags are split lengthwise for some distance from the lower end and are securely fastened to the support as by rivets 18. One end of each band spring is secured along with the bottom of the bag to the support while its other end is free and passes behind the belt 7. In order that the free end of the spring may be capable of movement without hindrance I have preferred to locate the band springs in oblique planes as stated, the free ends of the said bands being thus enabled to pass under the lower edge of the belt. Obviously, however, it would be possible to provide the belt or other support with holes through which the free ends of the springs might pass. It is to be observed that since the bags are split lengthwise one side of the bag is capable of movement with respect to the other, the material on one side of the split being secured to the support and that on the other side being secured to and movable with the free end of the band spring. The extent to which the band springs are permitted to open and thus the size of the spring outlets of the bags which they constitute is controlled by the gage rail 4 which is provided with cam sections 19 spaced from the supporting belt at successively greater distances from the head to the foot of the grader so that the spring outlets are automatically and successively enlarged as they pass over successive bins. This changing of the size of the bottom of the bags is attended with the formation of folds or wrinkles which should be kept outside the part of the bag secured to the belt so that the inside of the bag remains smooth. This is facilitated by locating the slit somewhat to one side of the point at which the fixed end of the band 16 and the bag are fastened and by employing an elastic strip 20 made of webbing or other suitable material, one end of which is secured to the free side of the slit as at 21 and the other end of which is secured to the belt at 22. The work which this strip is called upon to do puts no great strain on it, the band spring 16 being the really active member so that it is found that the bags wear out as soon as the elastic strips.

Fruit is delivered to my grader by any suitable means as a feed chute made of canvas or covered with lamb's wool or other soft material if desired. I prefer to arrange this chute in the line of active travel of the holders.

As already suggested, my grader while capable of general use is designed more especially for handling delicate fruits which must be protected from receiving bruises. To this end, I have provided an arrangement of individual fruit holders which permit the fruit to roll down an incline formed by a flexible bag and I have also so constructed the bins as to provide inclines slanting forward, i. e., toward the foot of the grader and downward as well as outward, i. e., away from the support for the holders from substantially the plane in which the fruit is fed and from the head end of each inlet opening. This will be more clearly apparent on reference to Fig. 2 in which the bottoms 3 of the bins beginning in substantially the plane in which the fruit is fed and at the head end of the inlet openings slant toward the foot of the machine away from the belt and downward. It will be obvious that this arrangement enables the fruit to roll onto the bottoms 3 without dropping as soon as the proper bin is reached and to roll therefrom to the lower part of the bin which at its end farthest from the belt is of uniform depth. This is especially important where peaches are being treated but it is also desirable with apples in which case a drop of any material distance might cause a bruise. It is obvious that while this feature of my invention is well adapted to holders of the form illustrated and when used with them produces a continuous rolling action, it is widely applicable and may be employed with feeding means of various kinds or even where the fruit is fed merely by gravity. In order to prevent possible injury to fruit which might have escaped partially from an outlet without having been completely released I may provide the sides of the bins at the foot ends of the inlet openings with lamb's wool or other soft material 25 so that any fruit striking the same would merely be pushed back into the outlet without being bruised.

The operation of my grader is as follows: The belt 7 being driven in the direction indicated by the arrows, fruit is fed into the holding bags by the feed chute 23 and at such speed as to furnish a single piece of fruit to each holder. The fruit thus fed runs down the incline furnished by the bag to the spring outlet which has been closed up by the end of the cam rail 4 as indicated in Figs. 1 and 2 so that it restrains the fruit from passing out of the bag unless it be of the smallest size it is desired to grade. If the fruit is too large to pass through the outlet while the said outlet is over the first bin, if of the next larger size to be graded, it will pass through the outlet when this begins to travel over the next bin, the cam section 19 corresponding thereto being spaced farther from the supporting belt so as to permit the spring outlet to enlarge. This successive enlargement due to the expansion of the spring and the increasing distance from the belt of the cam sections continues to take place until even a piece of fruit of the largest size dealt with is permitted to pass through into the last bin after which the spring outlets freed from any restraint by the cams expand completely and are carried around in this condition until the other end of the gage rail 4 is reached when they are again contracted, the free ends of the band springs 16 passing underneath the edge of the belt as before.

In order to make the operation of my grader clearer, I have exaggerated considerably the relative size of the feeding means, although this exaggeration would not prevent the proper operation of the apparatus but would only mean an unnecessary addition to the cost of the machine.

What I claim as my invention is:

1. A fruit grader comprising in combination a series of bins, a plurality of individual fruit holding bags provided at their bottoms with variable outlets, means for moving said fruit holding bags over said bins, and devices for successively enlarging said outlets as the fruit holding bags pass over successive bins.

2. A fruit grader comprising in combination a series of bins, a plurality of fruit holding bags provided at their bottoms with variable outlets, means for moving said fruit holding bags over said bins, said bags being inclined downward and forward, and devices for successively enlarging said outlets as the fruit holding bags pass over successive bins.

3. A fruit grader comprising in combination a series of bins, a support, means for moving said support over said bins, a plurality of individual fruit holding bags of flexible material secured to said support having variable outlets and slit lengthwise the material of a bag at one side of the slit being fastened to said support and the material at the other side being yieldingly joined to said support by an elastic connection, and devices for successively enlarging said outlets as the fruit holding bags pass over successive bins.

4. A fruit grader comprising in combination a series of bins, a plurality of individual fruit holding bags provided at their bottoms with variable outlets, a support for said bags, means for moving said support over said bins from the head toward the foot of the grader, said bags being inclined downward and forward, a feed chute in substantially the plane of the bags as they are moved forward over said bins by said support, and devices for successively enlarging said outlets as the fruit holding bags pass over successive bins.

5. A fruit grader comprising in combination a series of bins arranged side by side and provided with alined inlet openings increasing successively in width from the head toward the foot of the grader, a plurality of individual fruit holders provided with band spring outlets, means for moving said holders over said inlet openings from the head toward the foot of the grader, and a gage rail extending from the head toward the foot of the grader located adjacent the path of said band spring outlets and having a series of cam sections coöperating with the band spring outlets to permit their successive enlargement as they pass over successive bins.

6. A fruit grader comprising in combination a series of bins arranged side by side and provided with alined inlet openings increasing successively in width from the head toward the foot of the grader, a plurality of individual fruit holders provided with spring outlets, means for moving said holders over said inlet openings from the head toward the foot of the grader, and an adjustable gage rail extending from the head toward the foot of the grader located adjacent the path of said spring outlets and having a series of cam sections coöperating with the spring outlets to permit their successive enlargement as they pass over successive bins.

7. A fruit grader comprising in combination a series of bins located side by side and provided with alined inlet openings increasing successively in width from the head toward the foot of the grader, individual fruit holding bags provided at the bottom with spring outlets, means for moving the said bags successively over said openings from the head toward the foot of the grader the said bags slanting downward and forward, and a series of cams located adjacent the path of the spring outlets of the bags, corresponding to successive bins and permitting said outlets to open wider as they pass toward the foot of the grader.

8. A fruit grader comprising in combination a series of bins located side by side and provided with alined inlet openings increasing successively in width from the head toward the foot of the grader, individual fruit holding bags provided at the bottom with spring outlets, means for moving the said bags successively over said openings from the head toward the foot of the grader the said bags slanting downward and forward and having their spring outlets located in planes inclined to the horizontal, and a series of cams located adjacent the path of the spring outlets of the bags, corresponding to successive bins and permitting said outlets to open wider as they pass toward the foot of the grader.

9. A fruit grader comprising in combination a series of bins provided with alined inlet openings increasing successively in width from the head toward the foot of the grader, a series of individual fruit holding bags of flexible material, means for moving said fruit holding bags successively over said openings from the head toward the foot of the grader, said bags being inclined downward and forward and being slit lengthwise and having their bottoms provided with band springs one end of which is free, and a series of cams located adjacent the path of said band springs for determining their position and thereby also the size of the opening in the bottom of each bag, said cams permitting said springs to open wider as successive bins toward the foot of the machine are reached.

10. A fruit grader comprising in combination a series of bins provided with alined inlet openings increasing successively in width from the head toward the foot of the grader, an upright support, means for moving said support from the head toward the foot of the grader, a series of individual fruit holding bags secured to said support and slanting downward and forward from the upper part to the lower part thereof, a band spring secured to the bottom of each bag and having one end secured also to the support and the other free and passing behind the same, and a series of cams corresponding to the respective bins and located adjacent the path in which the band springs move, said cams being spaced successively greater distances away from the said support from the head toward the foot of the grader to permit said springs to open wider as successive bins nearer the foot of the machine are reached.

11. A fruit grader comprising in combination a series of bins provided with alined inlet openings increasing successively in width from the head toward the foot of the grader, an upright support, means for moving said support from the head toward the foot of the grader, a series of individual fruit holding bags secured to said support and slanting downward and forward from the upper part to the lower part thereof, a band spring secured to the bottom of each bag, lying in a plane oblique to the horizontal, having one end secured also to the support and the other free and passing under the lower edge thereof, and a series of cams corresponding to the respective bins and located adjacent the path in which the band springs move, said cams being spaced successively greater distances away from the said support from the head toward the foot of the grader to permit said springs to open wider as successive bins nearer the foot of the machine are reached.

12. A fruit grader comprising in combination a series of bins provided with alined inlet openings increasing successively in width from the head toward the foot of the grader, an endless upright support, means for moving it past the inlet openings to said bins from the head toward the foot of the grader, a series of individual fruit holding bags of flexible material having at their tops a rigid band holding said tops distended, and secured to the support said bags slanting downward and forward being slit lengthwise and being provided at their bottoms with a band spring secured to the holding bag and having one end secured to said support at one side of the slit and having its other end free and passing behind said support, and an elastic strip having one end secured at the other or free side of the slit and having its other end secured to the support.

13. A fruit grader comprising in combination a series of bins provided with alined inlet openings increasing successively in width from the head toward the foot of the grader, an endless upright support, means for moving it past the inlet openings to said bins from the head toward the foot of the grader, a series of individual fruit holding bags of flexible material having at their tops a rigid band holding said tops distended, and secured to the support said bags slanting downward and forward being slit lengthwise and being provided at their bottoms with a band spring, lying in a plane oblique to the horizontal, secured to the holding bag and having one end secured to said support at one side of the slot and having its other end free and passing behind said support, and an elastic strip having one end secured at the other or free side of the slit and having its other end secured to the support.

14. A fruit grader comprising in combination a series of bins, an endless belt having flights located in vertical planes, means for driving said belt over the said bins from the head toward the foot of the grader, individual fruit holding bags supported by said belt and slanting downward and forward from the upper part of said belt to the lower part, each of said holding bags being slit longitudinally and having at its lower end a band spring located in a plane oblique to the horizontal, one end of said band spring being secured to the belt and the other end being free and passing under the lower edge thereof, an elastic strip secured to said belt and having its other end secured to the holding bag adjacent the side of the slit, and a gage rail located adjacent the path of movement of said band spring consisting of a series of sections spaced at successively greater distances from the belt from the head toward the foot of the machine and coöperating with the band springs to determine the position thereof and thereby also the size of the opening in the bottom of said holder.

15. A fruit grader comprising in combination a plurality of bins provided with alined inlet openings increasing successively in width from the head toward the foot of the grader, and means for feeding fruit over said successive openings, said bins having their respective bottoms inclined forward and downward as well as outward from substantially the plane in which the fruit is fed and from the head end of the corresponding inlet opening.

16. A fruit grader comprising in combination a series of bins located side by side and provided with alined inlet openings increasing successively in width from the head toward the foot of the grader, said bins having their respective bottoms inclined forward and outward as well as downward from substantially the plane in which the fruit is fed and from the head end of the corresponding inlet opening, the side of each bin adjacent the foot of its inlet being clothed with soft material.

17. A fruit grader comprising in combination a series of bins located side by side and provided with alined inlet openings increasing successively in width from the head toward the foot of the grader, a plurality of individual fruit holders, means for moving them over said alined inlet openings from the head toward the foot of the grader, means corresponding to each inlet opening for causing said holders to release the fruit, and a plurality of inclines corresponding respectively to said bins and having their upper ends located adjacent the path of said fruit holders for receiving the fruit as it is released by said holders and permitting it to roll to the lower part of the bin without dropping.

18. A fruit grader comprising in combination a series of bins located side by side and provided with alined inlet openings increasing in size successively from the head toward the foot of the grader, a plurality of individual fruit holders, means for carrying said holders successively over said openings from the head toward the foot of the grader, spring outlets carried by said holders, and cams for controlling said outlets to permit the successive enlargement thereof to release the fruit at the opening to the proper bin, each of said bins being provided with an incline slanting downward and forward from substantially the plane in which the bottoms of said individual fruit holders move and from the head end of the corresponding inlet opening to the lower part of the bin to permit the fruit to roll onto the same without dropping.

In testimony whereof I affix my signature in presence of two witnesses.

ORSON K. PORTER.

Witnesses:
JOHN L. FLETCHER,
MARGARET E. DILLER.